US009047718B2

(12) United States Patent
Kakinuma et al.

(10) Patent No.: US 9,047,718 B2
(45) Date of Patent: Jun. 2, 2015

(54) VEHICLE DIAGNOSTIC METHOD, AND EXTERNAL DIAGNOSTIC DEVICE

(75) Inventors: Hiroyuki Kakinuma, Saitama (JP); Sakae Ito, Kazo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/353,060

(22) PCT Filed: Jun. 6, 2012

(86) PCT No.: PCT/JP2012/064528

§ 371 (c)(1), (2), (4) Date: Apr. 21, 2014

(87) PCT Pub. No.: WO2013/061647

PCT Pub. Date: May 2, 2013

(65) Prior Publication Data

US 2014/0244099 A1 Aug. 28, 2014

(30) Foreign Application Priority Data

Oct. 28, 2011 (JP) ................................ 2011-237335

(51) Int. Cl.

| | |
|---|---|
| ***G01M 17/00*** | (2006.01) |
| ***G07C 5/00*** | (2006.01) |
| ***G07C 5/08*** | (2006.01) |

(52) U.S. Cl.

CPC .............. *G07C 5/008* (2013.01); *G07C 5/0808* (2013.01); *G07C 2205/02* (2013.01)

(58) Field of Classification Search

USPC ........................................................ 701/31.4

See application file for complete search history.

(56) References Cited

U.S. PATENT DOCUMENTS

| | | | | |
|---|---|---|---|---|
| 6,175,786 | B1 | 1/2001 | Takakura et al. | |
| 6,314,375 | B1 * | 11/2001 | Sasaki et al. | 702/34 |
| 2002/0065590 | A1 | 5/2002 | Matsui | |
| 2002/0095977 | A1 * | 7/2002 | Maloney et al. | 73/116 |
| 2002/0174852 | A1 * | 11/2002 | Choi | 123/339.11 |
| 2003/0070423 | A1 * | 4/2003 | Morinaga et al. | 60/284 |
| 2013/0110378 | A1 * | 5/2013 | Nakagawa et al. | 701/103 |

FOREIGN PATENT DOCUMENTS

| | | | |
|---|---|---|---|
| JP | 62-064652 | A | 3/1987 |
| JP | 09-210870 | A | 8/1997 |
| JP | 11-094706 | A | 4/1999 |
| JP | 2002-168734 | A | 6/2002 |

OTHER PUBLICATIONS

International Search Report dated Aug. 7, 2012 corresponding to International Patent Application No. PCT/JP2012/064528 and English translation thereof.

* cited by examiner

*Primary Examiner* — Hussein A. Elchanti

(74) *Attorney, Agent, or Firm* — Squire Patton Boggs (US) LLP

(57) ABSTRACT

In a vehicle diagnostic method and an external diagnostic device, sensor detection values acquired by communicating with an ECU are measured to determine whether the values are in a normal range while a vehicle is idling. After an engine is started, an operation to measure soundness is prohibited at least until the sensor detection values including the engine rotational frequency reach a threshold value region indicating the completion of the warm-up operation. The fluctuation state of the sensor detection values is displayed on an operation screen until the sensor detection values reach the threshold value region.

8 Claims, 10 Drawing Sheets

100

100

100

100

100

100

VEHICLE DIAGNOSTIC METHOD, AND EXTERNAL DIAGNOSTIC DEVICE

TECHNICAL FIELD

The present invention relates to a vehicle diagnostic method and an external diagnostic apparatus (device) for making a diagnosis of the health state of a vehicle (deterioration diagnosis).

BACKGROUND ART

If a vehicle suffers a fault, the vehicle is taken to a repair shop of a dealer or the like. The operator (technician) who is responsible for repairing the vehicle connects an electronic control unit (hereinafter referred to as "ECU") on the vehicle to an external diagnostic apparatus, reads fault data (fault code) from the ECU, analyzes a defective location or a fault source, and makes necessary repairs or an necessary adjustment.

When vehicles are manufactured, they are checked at the final inspection stage of the production process to see if their sensors or ECUs are functioning properly or not. While vehicles to be diagnosed are conveyed one after another at the final inspection stage, each of the vehicles is controlled to operate (idle) stably and then diagnosed collectively and efficiently {see S603 in FIG. 12, [0044], and [0045] of Japanese Laid-Open Patent Publication No. 09-210870 (hereinafter referred to as "JP09-210870A")}. According to JP09-210870A, after a cable 5 of a vehicle diagnostic apparatus 2 is connected to each of successively conveyed vehicles, the vehicle diagnostic apparatus 2 automatically starts diagnosing the vehicle without displaying a menu screen ([0035]).

SUMMARY OF INVENTION

According to JP09-210870A, as described above, since diagnostic conditions are prepared for a vehicle diagnosis by controlling each of the successively conveyed vehicles to be diagnosed to operate (idle) stably, the vehicles can successively be diagnosed efficiently to see if their sensors or ECUs are functioning properly or not.

If a vehicle that has been used for many years is to be diagnosed for its health state (health diagnosis) for the purpose of preventing the vehicle from suffering faults, then the vehicle is taken to the repair shop of the dealer or the like and individually diagnosed as in the case where the vehicle suffers a fault. In the repair shop, the vehicle should preferably be measured in a stable operating condition, e.g., after it has been warmed up.

However, if a long waiting time is needed until a measurement starting condition is met, e.g., the vehicle has been warmed up, then the operator tends to fail to recognize that there is a possibility of occurrence of deterioration in parts related to, for example, the long waiting time until the measurement starting condition is met, the reason why the measurement starting condition cannot be met, and the measurement starting condition. Consequently, it is likely for the operator to have difficulty in diagnosing the health state of the vehicle with accuracy.

The present invention has been made in view of the above problems. It is an object of the present invention to provide a vehicle diagnostic method and an external diagnostic apparatus which are capable of diagnosing the health state of a vehicle highly accurately.

According to the present invention, there is provided a vehicle diagnostic method for diagnosing a vehicle by an external diagnostic apparatus acquiring detected sensor values of the vehicle from the vehicle via data communication between an electronic control unit mounted on the vehicle and the external diagnostic apparatus, wherein the detected sensor values include an engine rotational speed, and the external diagnostic apparatus carries out an idling confirming step of measuring whether or not the engine rotational speed is within a normal range for the vehicle that is idling, a health state measuring step of, when the vehicle is idling, measuring whether the detected sensor values acquired via communication with the electronic control unit are within normal ranges or not, a measurement inhibiting step of inhibiting the measurement of the health state measuring step, after an engine has started and until the detected sensor values including at least the engine rotational speed reach threshold value regions indicating completion of warming-up of the vehicle, and a varying state display step of displaying varying states of the detected sensor values on an operating screen until the detected sensor values reach the threshold value regions.

According to the present invention, since the measurement (health state measurement) of the health state measuring step using the detected sensor values is inhibited until the vehicle has been warmed up, the health state of the vehicle can be measured accurately.

While the health state of the vehicle is inhibited from being measured, the varying states of the detected sensor values for judging a condition for inhibiting the measurement of the health state are displayed. Therefore, the user can confirm the reason why the measurement of the health state is inhibited, as the varying states in the detected sensor values, and can visually confirm the changing situation and how it changes until the inhibition of the measurement of the health state is canceled. In addition, in a case where it is taking more time than usual until the inhibition of the measurement of the health state is canceled, the user can recognize which one of the detected sensor values does not satisfy a condition for canceling the inhibition of the measurement of the health state. Therefore, the user is enabled to know that some trouble has been occurring in relation to the detected sensor value that does not satisfy the condition for canceling the inhibition of the measurement of the health state.

According to the present invention, furthermore, it is judged whether the detected sensor values are within the normal ranges or not only if the vehicle is idling. It is thus possible to measure the health state under a condition where the engine is operating stably, and hence the health state can be measured highly accurately.

A first start button for giving an instruction to start the measurement of the health state measuring step may be displayed on the operating screen. The first start button may be displayed as inactive so as to be non-selectable during the measurement inhibiting step, and the first start button may be displayed as active so as to be selectable after the measurement inhibiting step has been ended. The varying states of the detected sensor values may be displayed together with the first start button that is displayed as inactive.

Therefore, the varying states of the detected sensor values (the engine rotational speed, etc.) are displayed together with the first start button that is displayed as inactive until the displayed first start button goes from inactive to active. Consequently, information about whether the health state is inhibited from being measured or not is given to the user in a plain fashion. In addition, since the user is enabled to know the progress status of warming-up of the vehicle based on the varying states of the detected sensor values (the engine rotational speed, etc.), the user can avoid wrong operations during the waiting time.

The detected sensor values may include a coolant water temperature of the engine in addition to the engine rotational speed, and the varying state display step may display, on the operating screen, the varying states of the engine rotational speed and the coolant water temperature as animation images. Thus, the user can easily confirm the varying states of the engine rotational speed and the coolant water temperature, and can effectively use the waiting time until the inhibition of the measurement of the health state is canceled.

When the external diagnostic apparatus is turned on, the external diagnostic apparatus may acquire the detected sensor values including the engine rotational speed and the coolant water temperature regardless of whether the engine has started or not.

When the first start button is displayed as inactive, a second start button for giving an instruction to start another diagnosis function may be displayed as active so as to be selectable on the operating screen. Therefore, it is possible to start another diagnosis function even before the preparations for the measurement of the health state are completed. The waiting time until the warming-up of the vehicle is completed can thus be used to perform another diagnosis function.

According to the present invention, there is also provided an external diagnostic apparatus for diagnosing a vehicle by acquiring detected sensor values of the vehicle through an electronic control unit mounted on the vehicle via data communication with the electronic control unit from outside of the vehicle, wherein the detected sensor values include an engine rotational speed, and the external diagnostic apparatus comprises an idling confirming unit for measuring whether or not the engine rotational speed is within a normal range for the vehicle that is idling, a health state measuring unit for, when the vehicle is idling, measuring whether the detected sensor values acquired via communication with the electronic control unit are within normal ranges or not, a measurement inhibiting unit for inhibiting the measurement of the health state measuring unit until the detected sensor values including at least the engine rotational speed reach threshold value regions indicating completion of warming-up of the vehicle, and a varying state display unit for displaying varying states of the detected sensor values on an operating screen after an engine has started and until the detected sensor values reach the threshold value regions.

DESCRIPTION OF EMBODIMENTS

A. Embodiment:

[1. Configuration]

(1-1. Overall Configuration)

Figure 1:
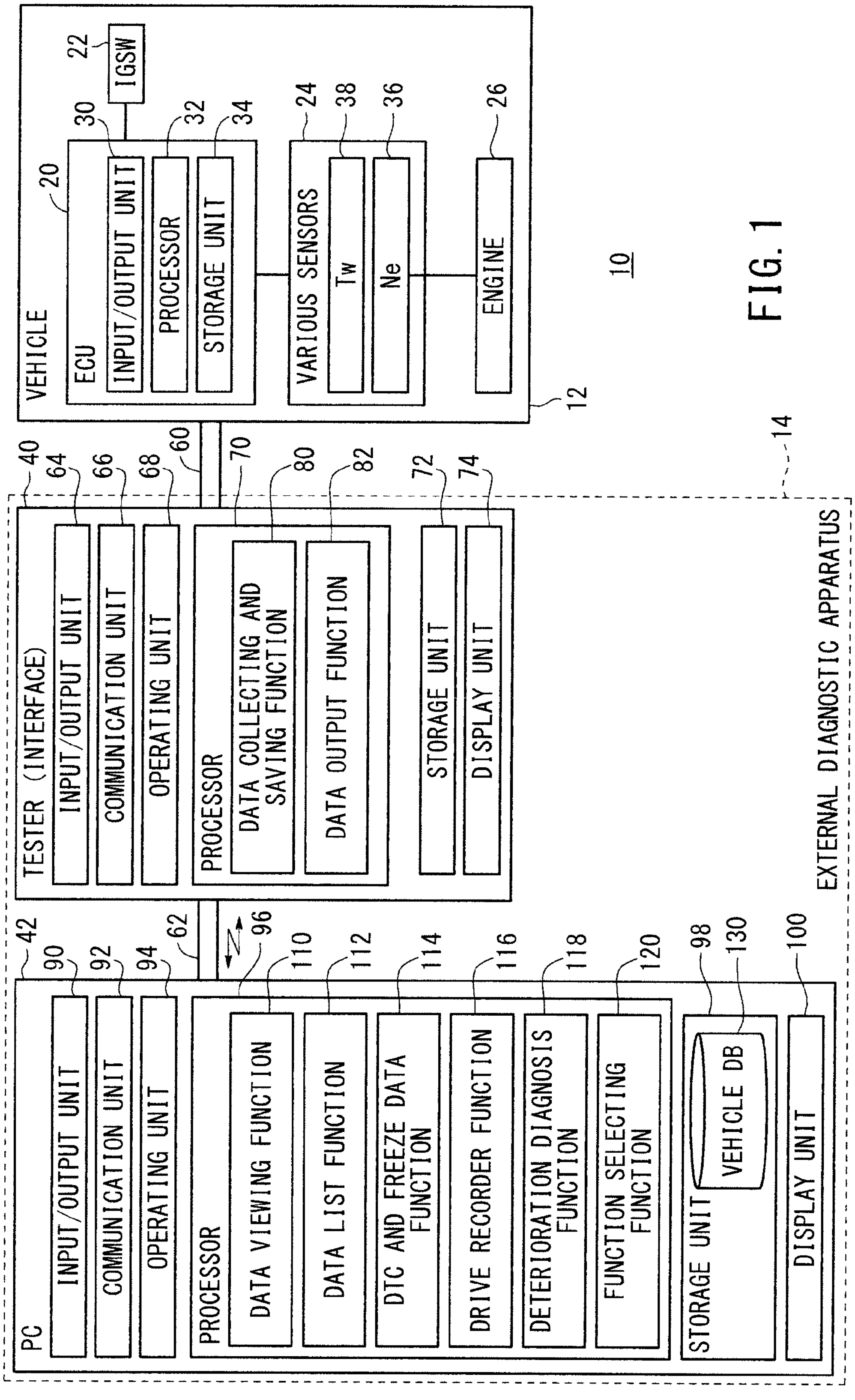
FIG. 1 is a block diagram showing a general configuration of a fault diagnostic system having an external diagnostic apparatus according to an embodiment of the present invention.

FIG. 1 shows in block form a general configuration of a fault diagnostic system 10 (hereinafter referred to as "system 10") having an external diagnostic apparatus 14 (hereinafter referred to as "diagnostic apparatus 14") according to an embodiment of the present invention. The system 10 includes a vehicle 12 (a motorcycle in the present embodiment) as a diagnostic target and the diagnostic apparatus 14 for making a fault diagnosis of the vehicle 12 from outside the vehicle 12.

(1-2. Vehicle 12)

The vehicle 12 has an electronic control unit 20 (hereinafter referred to as "ECU 20"), an ignition switch (hereinafter referred to as "IGSW 22") for controlling on and off of the ECU 20, and various sensors 24. The ECU serves to control an engine 26, a transmission (not shown), a brake (not shown), etc. of the vehicle 12. As shown in FIG. 1, the ECU 20 has an input/output unit 30, a processor 32, and a storage unit 34.

The various sensors 24 include an engine rotational speed sensor 36 for detecting the rotational speed of the engine 26 (hereinafter referred to as "engine rotational speed Ne") [rpm], and a water temperature sensor 38 for detecting the temperature of the coolant water of the engine 26 (hereinafter referred to as "coolant water temperature Tw") [° C.].

In the present embodiment, the engine 26 is a gasoline engine, and the vehicle 12 is a gasoline-powered vehicle. As described later, the vehicle 12 may be a vehicle such as a diesel engine vehicle, an electric vehicle, a hybrid vehicle, or the like. Though the vehicle 12 according to the present embodiment is a motorcycle, it may be a three-wheeled vehicle, a four-wheeled vehicle, a six-wheeled vehicle, or the like.

(1-3. External Diagnostic Apparatus 14)

(1-3-1. Overall Configuration)

The external diagnostic apparatus 14 has a tester 40 and a personal computer 42 (hereinafter referred to as "PC 42"). The diagnostic apparatus 14 is capable of making various diagnoses (including a health diagnosis) of the vehicle 12.

(1-3-2. Tester 40)

The tester 40 is used in various diagnoses (inspections) as a communication interface to be connected to the ECU 20 of the vehicle 12 in a car dealer, a service shop, or the like, for reading data of the vehicle 12. The tester 40 has a lower processing capability and a smaller storage capacity than the PC 42, but is smaller in size and has better portability than the PC 42. The tester 40 can make, by itself, various diagnoses (or inspections) on the vehicle 12 using various data (detected sensor values) read from the vehicle 12, and can also save the read data and thereafter send them to the PC 42.

As shown in FIG. 1, the tester 40 has a first cable 60 connected to the ECU 20 of the vehicle 12, a second cable 62 connected to the PC 42, an input/output unit 64 connected to the first cable 60 and the second cable 62 for inputting and outputting signals, a communication unit 66 for performing wireless communication with the PC 42, an operating unit 68, a processor 70 for controlling components of the tester 40, a storage unit 72 for storing programs including control programs run by the processor 70 and data, and a display unit 74.

The operating unit 68 has operating buttons, etc. for performing operating processes to send output commands (pseudo signals) to the ECU 20 or the various sensors 24 of the vehicle 12 when necessary.

The processor 70 has a data collecting and saving function 80 and a data output function 82. The data collecting and saving function 80 is a function to collect various data (sensor output values) from the vehicle 12 through the ECU 20 and saving the collected data in the storage unit 72. The data output function 82 is a function to output the various data saved in the storage unit 72 to the PC 42.

The display unit 74 displays various data read from the ECU 20 on a monitor screen.

The first cable 60 may be replaced with a wireless communication function. The tester 40 and the PC 42 can communicate with each other through a wired communication link via the second cable 62 and also through a wireless communication link via the communication unit 66. However, the tester 40 and the PC 42 may communicate with each other through either one of the wired communication link and the wireless communication link.

(1-3-3. PC 42)

The PC 42 has an input/output unit 90 connected to the second cable 62 for inputting and outputting signals, a communication unit 92 for performing wireless communication with the tester 40, an operating unit 94 including a keyboard, a mouse, a touch pad, etc., not shown, a processor 96 for controlling components of the PC 42 and making various diagnoses, a storage unit 98 for storing programs including control programs, diagnostic programs, etc. run by the processor 96 and also storing data, and a display unit 100 for displaying various information. The PC 42 may comprise a commercially available laptop personal computer as hardware.

The processor 96 has a data viewing function 110, a data list function 112, a DTC and freeze data function 114 (hereinafter referred to as "DTC function 114"), a drive recorder function 116, a deterioration diagnosis function 118, and a function selecting function 120.

The data viewing function 110 is a function to read, display, and edit data stored in the storage unit 98 of the PC 42. The data list function 112 is a function to list and display data that can be acquired from the vehicle 12.

The DTC function 114 is a function to display and edit fault codes (DTC: Diagnostic Trouble Code) and freeze data. If the ECU 20 detects a fault in the vehicle 12, then it saves a corresponding DTC in the storage unit 34 as information indicating the contents of the fault. The DTC function 114 of the PC 42 makes it possible to display and edit a DTC read from the ECU 20 in the present diagnosis and also a DTC read from the ECU 20 in the past (see FIG. 8). The freeze data represent detected sensor values related to a fault at the time the fault occurs, i.e., at the time the DTC is saved.

The drive recorder function 116 is a function to play and edit data from a drive recorder (not shown) in a case where the drive recorder is incorporated in the vehicle 12.

The deterioration diagnosis function 118 is a function to diagnose the health state {operating state (including a deteriorating state)} of the vehicle 12 at the present time. Specifically, the deterioration diagnosis function 118 checks if the detected sensor values from the vehicle 12 are abnormal or not, i.e., if the sensors have excessively deteriorated or not. The detected sensor values refer to data (operating parameters) indicating operating states of various components of the vehicle 12, and include not only output values from the sensors included in the various sensors 24, but also values processed by the ECU 20 or processors, not shown, based on the output values from the sensors.

Diagnostic target items that can be diagnosed by the deterioration diagnosis function 118 may include an engine rotational speed Ne, a water temperature sensor voltage, a throttle sensor voltage, an intake gas temperature sensor voltage, an intake pressure sensor voltage, an atmospheric pressure sensor voltage, an amount of injected fuel, an ignition timing, an idling air control valve opening degree, a battery voltage, and an oil temperature sensor voltage.

The function selecting function 120 is a function to select which one of the above functions 110, 112, 114, 116, 118 to be performed in response to an operating action of the user.

The storage unit 98 includes a vehicle database 130 (hereinafter referred to as "vehicle DB 130"). The vehicle DB 130 stores information representing the model name of the vehicle 12, the model year of the vehicle 12, the place of destination of the vehicle 12, the model code of the vehicle 12, the identification information of the ECU (hereinafter referred to as "ECU ID"), and DTC and freeze data, etc.

For making various diagnoses of the vehicle 12 using the PC 42, the first cable 60 of the tester 40 is connected to an unillustrated connector, i.e., a data link connector, disposed in the vehicle 12. By use of the second cable 62 or the communication units 66, 92, the ECU 20 and the PC 42 are made to be ready to communicate with each other. Thereafter, in response to the user operating the operating unit 94 of the PC 42, the PC 42 makes various diagnoses (including a health diagnosis) of the vehicle 12.

[2. Display Screen of PC 42]

Figure 2:
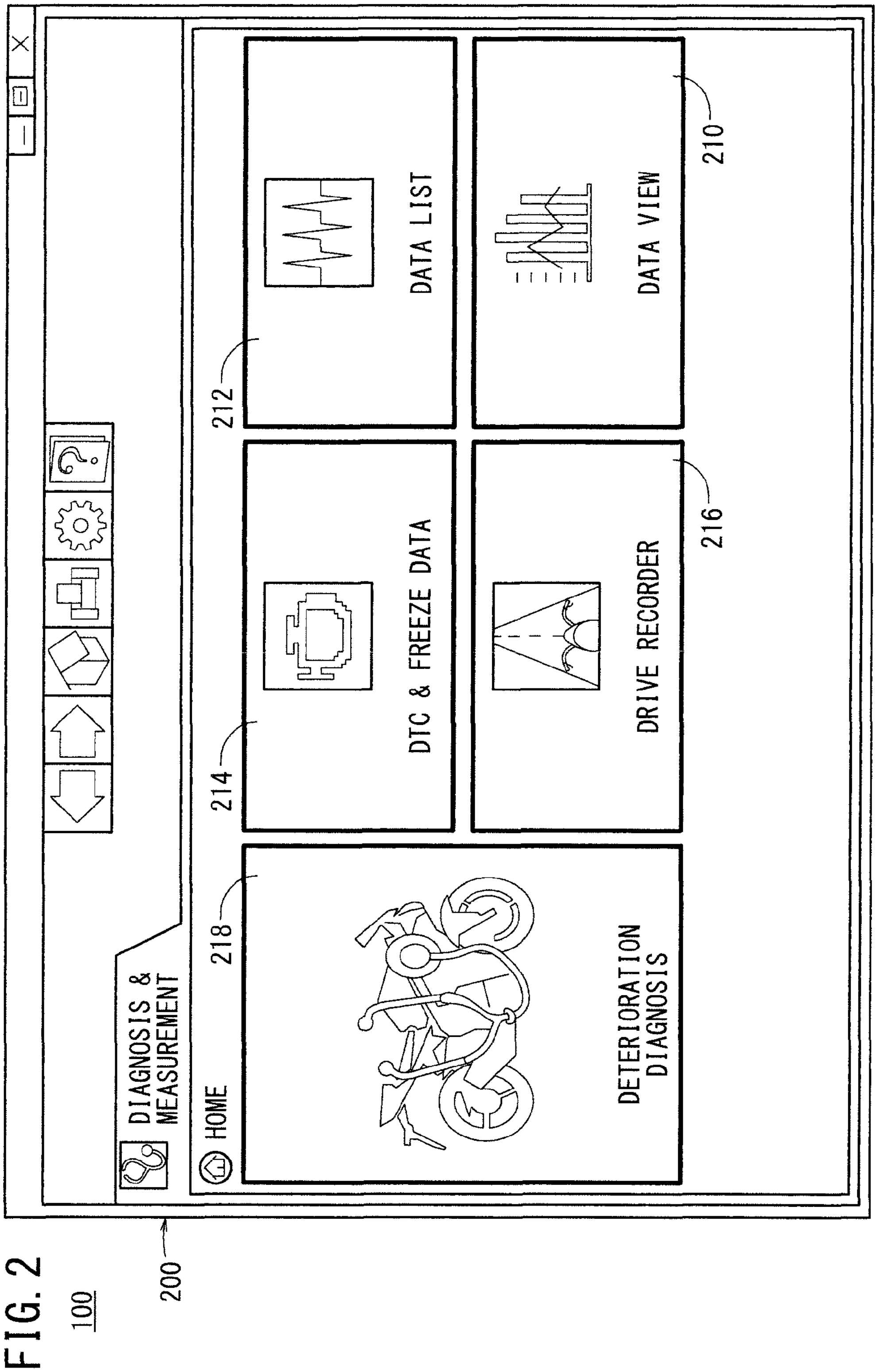
FIG. 2 is a diagram showing an example of a diagnosis function selecting screen displayed with all diagnosis function selecting buttons being active.

As described above, the PC 42 has the data viewing function 110, the data list function 112, the DTC function 114, the drive recorder function 116, and the deterioration diagnosis function 118. The PC 42 can make various diagnoses using these functions 110, 112, 114, 116, 118. In order to allow the user to select either one of the functions 110, 112, 114, 116, 118, the PC 42 (function selecting function 120) according to the present embodiment displays a display screen 200 shown in FIG. 2 (hereinafter referred to as "diagnosis function selecting screen 200", "function selecting screen 200", or "screen 200") on the display unit 100. FIG. 2 shows by way of example the screen 200 for selecting either one of the functions 110, 112, 114, 116, 118 in the present embodiment.

As shown in FIG. 2, the diagnosis function selecting screen 200 has five diagnosis function selecting buttons for reading data from the ECU 20, i.e., a data view function execution button 210 (hereinafter referred to as "data view button 210"), a data list function execution button 212 (hereinafter referred to as "data list button 212"), a DTC and freeze data function execution button 214 (hereinafter referred to as "DTC button 214"), a drive recorder function execution button 216 (hereinafter referred to as "drive recorder button 216"), and a deterioration diagnosis function execution button 218 (hereinafter referred to as "deterioration diagnosis button 218").

When the user selects the data view button 210 through the operating unit 94, the data viewing function 110 is performed. When the user selects the data list button 212 through the operating unit 94, the data list function 112 is performed. When the user selects the DTC button 214 through the operating unit 94, the DTC function 114 is performed. When the user selects the drive recorder button 216 through the operating unit 94, the drive recorder function 116 is performed.

When the user selects the deterioration diagnosis button 218 through the operating unit 94, the deterioration diagnosis function 118 is performed.

According to the present embodiment, if there is a diagnosis function that is permitted to be performed at that point in time, then the function selecting function 120 displays a selecting button corresponding to the diagnosis function as being active (selectable). On the other hand, if there is a diagnosis function that is not permitted to be performed at that point in time, then the function selecting function 120 displays a selecting button corresponding to the diagnosis function as being inactive (non-selectable). According to the present embodiment, furthermore, in order to make it easy for the user to distinguish between active and inactive selecting buttons, the function selecting function 120 displays the inactive selecting buttons in a paled-out and blurred fashion in comparison with the active selecting buttons (see FIGS. 2 and 5 through 7).

[3. Processing Sequence of External Diagnostic Apparatus 14]

Figure 3:
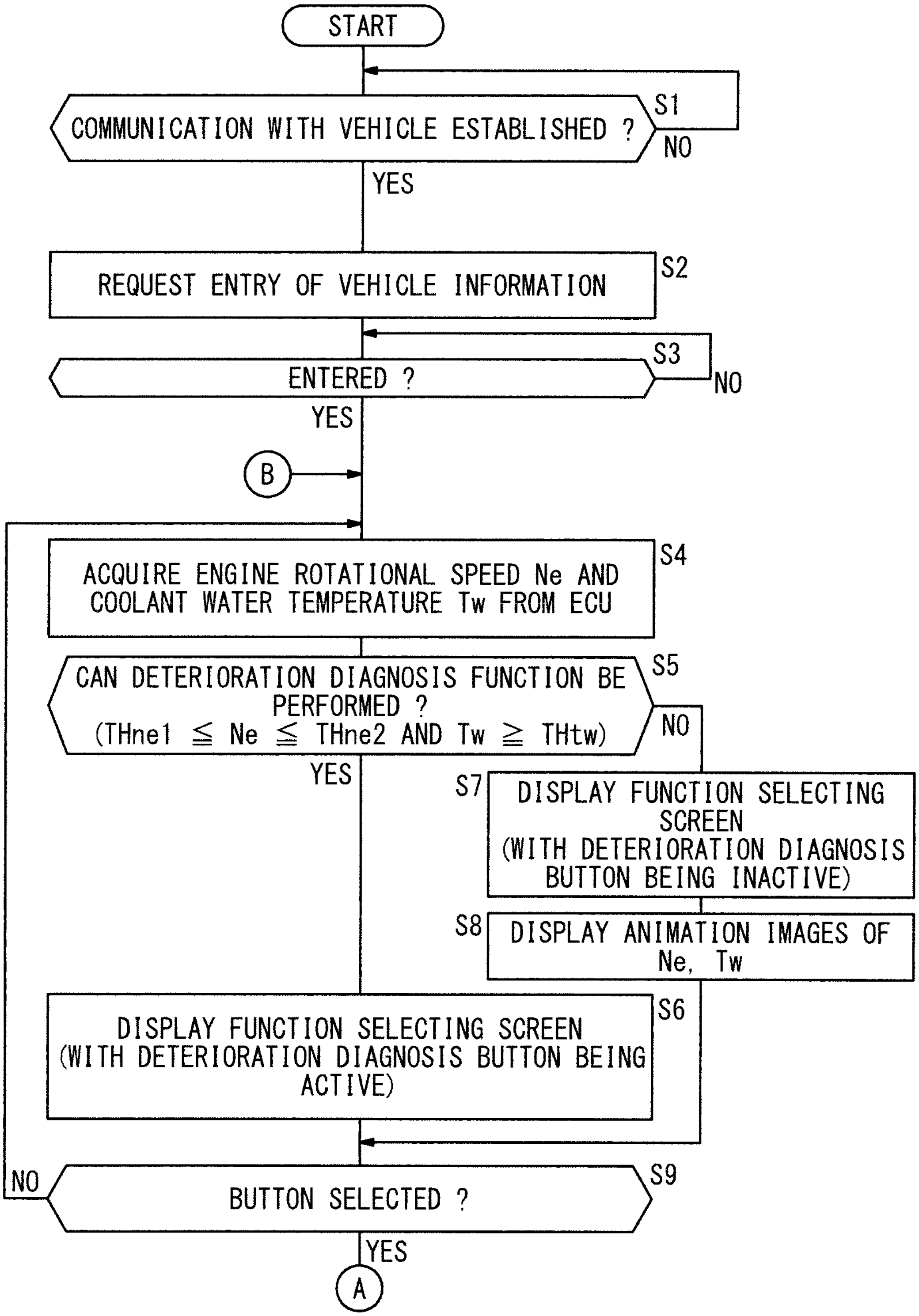
FIG. 3 is a first flowchart of a processing sequence of the external diagnostic apparatus.
Figure 4:
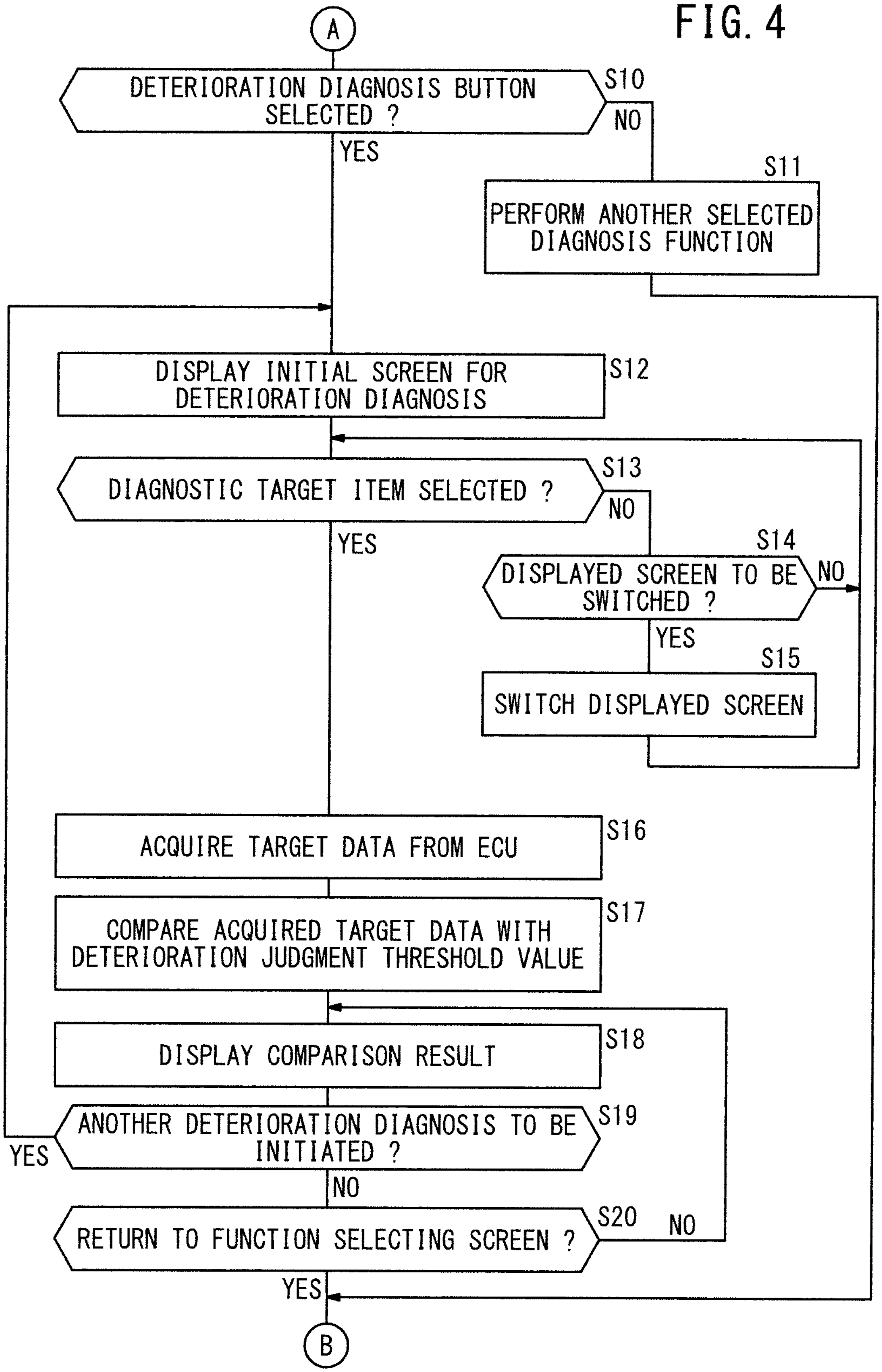
FIG. 4 is a second flowchart of the processing sequence of the external diagnostic apparatus.

FIGS. 3 and 4 are first and second flowcharts, respectively, of a processing sequence of the external diagnostic apparatus 14. Prior to the processing sequence shown in FIGS. 3 and 4, the user (technician) turns on the PC 42. For making a health diagnosis (deterioration diagnosis), the user turns on the IGSW 22 of the vehicle 12 to connect the ECU 20 and the tester 40 to each other for communication with each other and to connect the tester 40 and the PC 42 to each other for communication with each other. As described later, before step S4 (FIG. 3) at the latest, the user turns on the IGSW 22 to energize a starter motor, not shown, thereby to start the engine 26.

In step S1, the PC 42 (function selecting function 120) judges whether a communication link has been established between the PC 42 and the vehicle 12 through the tester 40 or not. If a communication link has not been established (S1: NO), then control repeats step S1.

Figure 5:
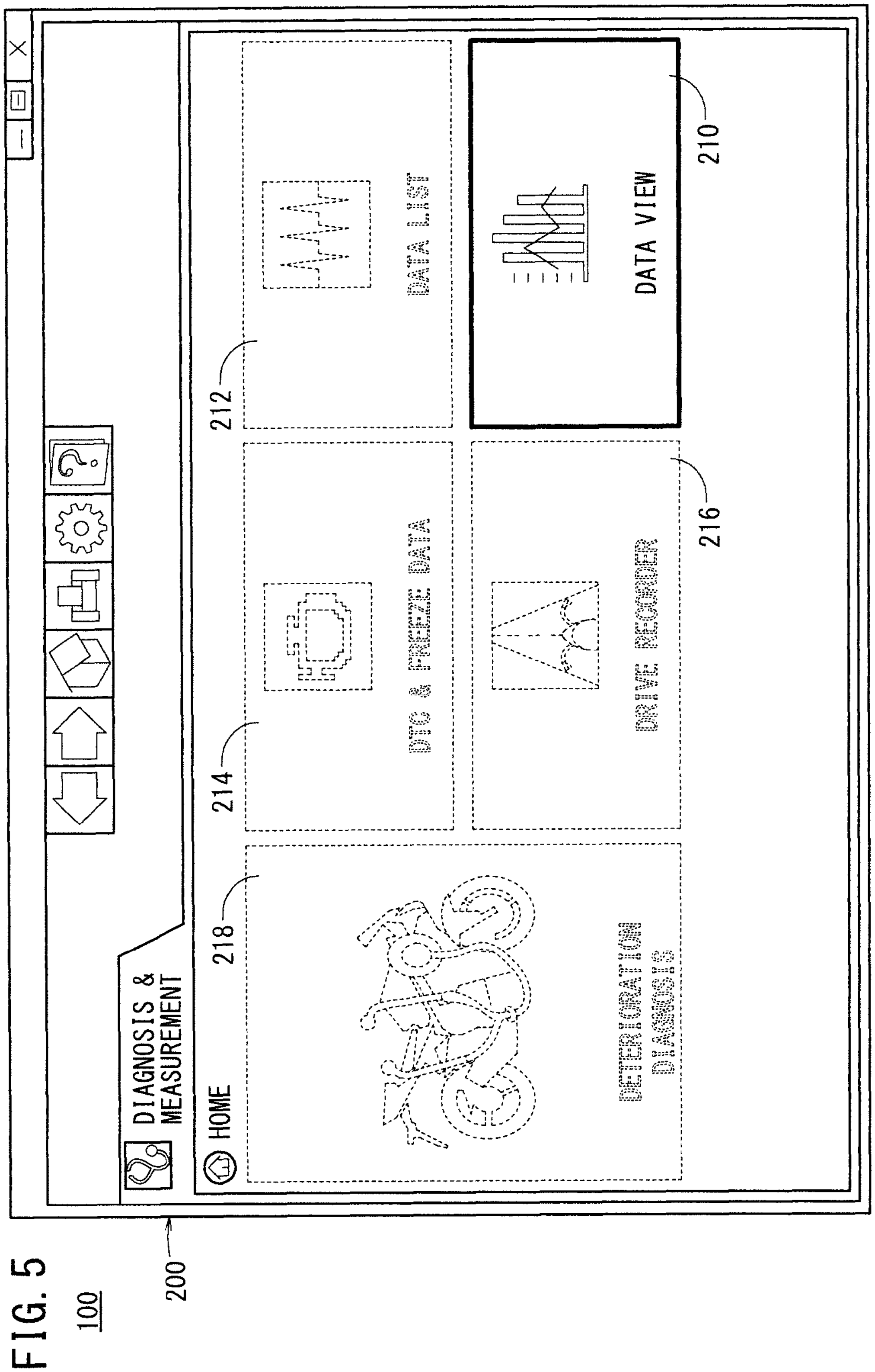
FIG. 5 is a diagram showing an example of the diagnosis function selecting screen displayed with only a data view function execution button being active.

If a communication link has not been established at the time of step S1, then the PC 42 (function selecting function 120) may display, on the display unit 100, the function selecting screen 200 with only the data view button 210 among the five diagnosis function selecting buttons being active (see FIG. 5). In this case, the other selecting buttons (i.e., the data list button 212, the DTC button 214, the drive recorder button 216, and the deterioration diagnosis button 218) are displayed as being inactive. Only the data viewing function 110 is allowed to be performed until a communication link with the vehicle 12 is established.

In FIG. 5, broken lines representing the selecting buttons 212, 214, 216, 218 indicate that these buttons are displayed in a paled-out and blurred fashion. Therefore, when the user sees how the selecting buttons are displayed, the user can recognize if each of the selecting buttons is active or inactive.

Figure 6:
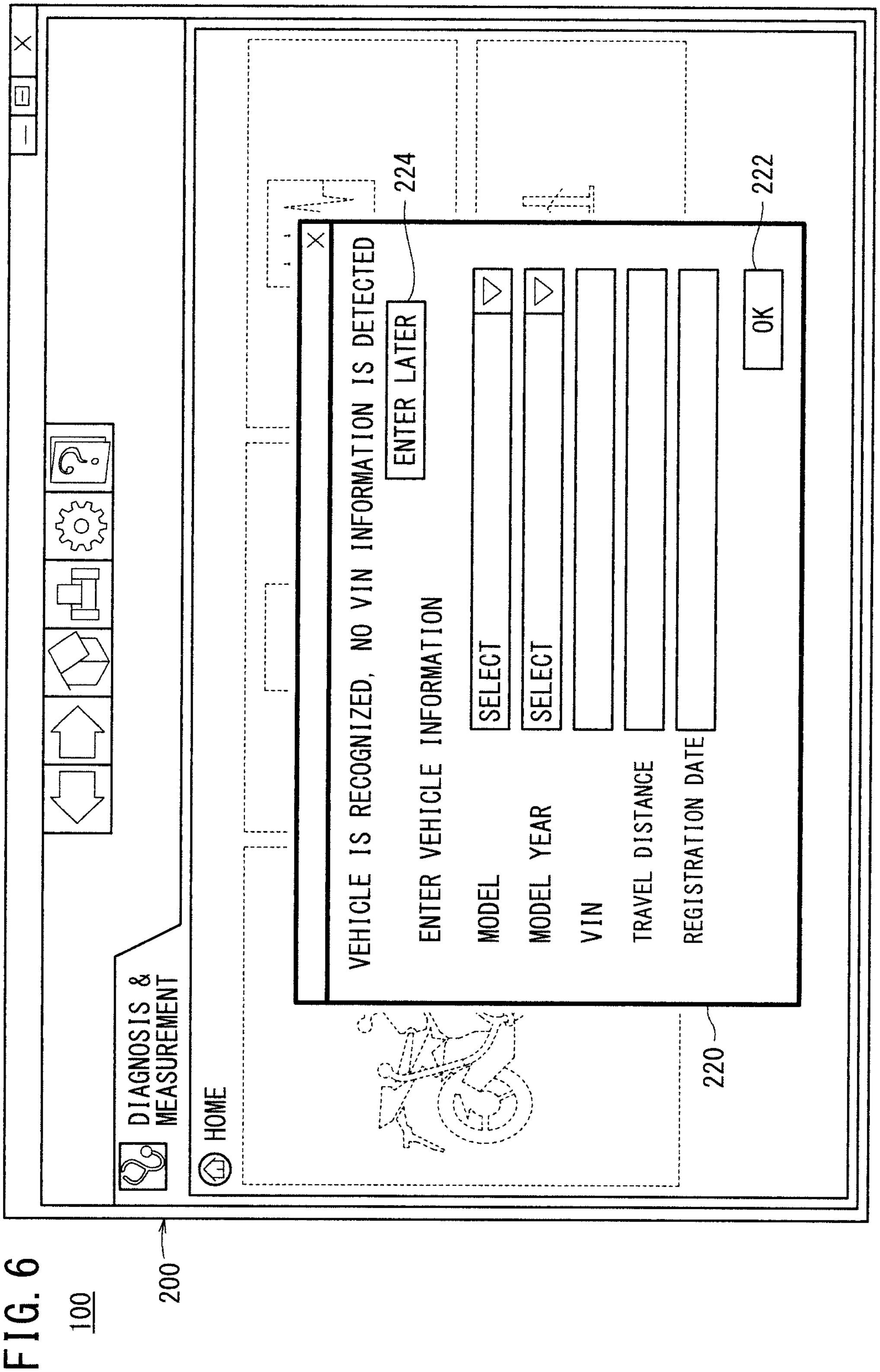
FIG. 6 is a diagram showing an example of a screen with an input box displayed for entering vehicle information.

If a communication link with the vehicle 12 has been established (S1: YES), then the PC 42 (function selecting function 120) requests the user to enter vehicle information in step S2. Specifically, the PC 42 (function selecting function 120) displays an input box 220 on the display unit 100 as shown in FIG. 6.

In step S3, the PC 42 (function selecting function 120) judges whether vehicle information has been entered or not. Specifically, the PC 42 (function selecting function 120) judges whether vehicle information has been entered in the input box 220 and an OK button 222 has been pressed or not. If vehicle information has not been entered (S3: NO), then control repeats step S3.

If the user enters input data representing the user's intention to hold entering of vehicle information at the time of step S3, or more specifically, if the user selects a button 224 with "ENTER LATER" displayed thereon (hereinafter referred to as "hold button 224") in the input box 220 shown in FIG. 6, then the PC 42 (function selecting function 120) may display, on the display unit 100, the function selecting screen 200 with the selecting buttons other than the deterioration diagnosis button 218, among the five diagnosis function selecting buttons (i.e., the data view button 210, the data list button 212, the DTC button 214, and the drive recorder button 216) being active. In this case, until vehicle information is entered, the health diagnosis (deterioration diagnosis) is not permitted to be performed, but the other functions are permitted to be performed.

If the OK button 222 is pressed while required vehicle information is not entered in part or entirety, then an error message may be displayed and thereafter the input box 220 may be displayed again.

If vehicle information has been entered (S3: YES), then the PC 42 (function selecting function 120) acquires the engine rotational speed Ne [rpm] and the coolant water temperature Tw [° C.] of the engine 26 from the ECU 20 through the tester 40 in step S4. Specifically, the PC 42 (function selecting function 120) sends an output command for the engine rotational speed Ne and the coolant water temperature Tw to the ECU 20 through the tester 40. In response to the output command, the ECU 20 acquires detected values from the engine rotational speed sensor 36 and the water temperature sensor 38 of the various sensors 24, and sends the detected values to the PC 42 through the tester 40.

In step S5, the PC 42 (function selecting function 120) judges whether the deterioration diagnosis function 118 can be performed or not. Specifically, the PC 42 judges whether or not the engine rotational speed Ne acquired in step S4 is equal to or greater than a first engine rotational speed threshold value THne1 (hereinafter referred to as "threshold value THne1") and equal to or smaller than a second engine rotational speed threshold value THne2 (hereinafter referred to as "threshold value THne2"). The threshold values THne1, THne2 define a range of engine rotational speed Ne at which the engine 26 operates in an idling state after it has been warmed up, and are stored in the storage unit 98 in advance. In addition, the PC 42 judges whether or not the coolant water temperature Tw acquired in step S4 is equal to or greater than a water temperature threshold value THtw (hereinafter referred to as "threshold value THtw"). The threshold value THtw refers to a coolant water temperature Tw of the coolant water after the engine 26 has been warmed up, and is stored in the storage unit 98 in advance.

If the deterioration diagnosis function 118 can be performed (step S5: YES), then the PC 42 (function selecting function 120) displays the function selecting screen 200 with all the five diagnosis function selecting buttons 210, 212, 214, 216, 218, which include the deterioration diagnosis button 218, being active (see FIG. 2) in step S6.

If the deterioration diagnosis function 118 cannot be performed (step S5: NO), then the PC 42 (function selecting function 120) displays the function selecting screen 200 with the deterioration diagnosis button 218 being inactive and the other selecting buttons 210, 212, 214, 216 being active (see FIG. 7) in step S7. Then, in step S8, the PC 42 (function selecting function 120) displays an animation image 230 (hereinafter referred to as "image 230") of the engine rotational speed Ne, an animation image 232 (hereinafter referred to as "image 232") of the coolant water temperature Tw, and a message 234 that it takes time until the deterioration diagnosis can be performed, within the area of the deterioration diagnosis button 218 on the function selecting screen 200 (see FIG. 7).

The image 230 is an animation image of a tachometer with its needle 236 displaced based on the engine rotational speed Ne acquired from the ECU 20. The image 230 allows the user to recognize the present engine rotational speed Ne. The image 230 may include the range between the threshold value THne1 and the threshold value THne2, so that the user can visually recognize the target range of engine rotational speed Ne.

The image 232 is an animation image of a glass thermometer using a temperature-sensitive liquid with its level displaced based on the coolant water temperature Tw acquired from the ECU 20. The image 232 allows the user to recognize the present coolant water temperature Tw. The image 232 may include the threshold value THtw or a range up from the threshold value THtw, so that the user can visually recognize the target coolant water temperature Tw or the target range.

The message 234 specifically includes descriptions "WAIT FOR WHILE" and "WAIT UNTIL CONDITIONS FOR IDLING MEASUREMENT ARE SATISFIED".

After step S6 or step S8, the PC 42 (function selecting function 120) judges whether either one of the five selecting buttons 210, 212, 214, 216, 218 has been selected or not in step S9. If neither one of the five selecting buttons 210, 212, 214, 216, 218 has been selected (S9: NO), then control goes back to step S4. If either one of the five selecting buttons 210, 212, 214, 216, 218 has been selected (S9: YES), then control goes to step S10 shown in FIG. 4.

While control is repeating the loop of steps S4, S5: NO, S7, S8, S9: NO shown in FIG. 3, the animation images 230, 232 are displayed. If the IGSW 22 is on, but the starter motor is not energized and hence the engine 26 is not started, then the animation image 230 indicates an engine rotational speed Ne=0 and the animation image 232 indicates a coolant water temperature Tw at the time. If the engine 26 has been started, the animation images 230, 232 change gradually with time.

In step S10 in FIG. 4, the PC 42 (function selecting function 120) judges whether the selected button is the deterioration diagnosis button 218 or not. If the selected button is not the deterioration diagnosis button 218 (S10: NO), then the PC 42 (function selecting function 120) performs the function corresponding to the selected button in step S11. For example, if the selected button is the DTC button 214, then the PC 42 (function selecting function 120) performs the DTC function 114 corresponding to the DTC button 214 to read DTC data recorded in the ECU 20, and the PC 42 (DTC function 114) displays, for example, a screen 240 shown in FIG. 8 (hereinafter referred to as "DTC and freeze data screen 240" or "DTC screen 240") on the display unit 100.

Figure 8:
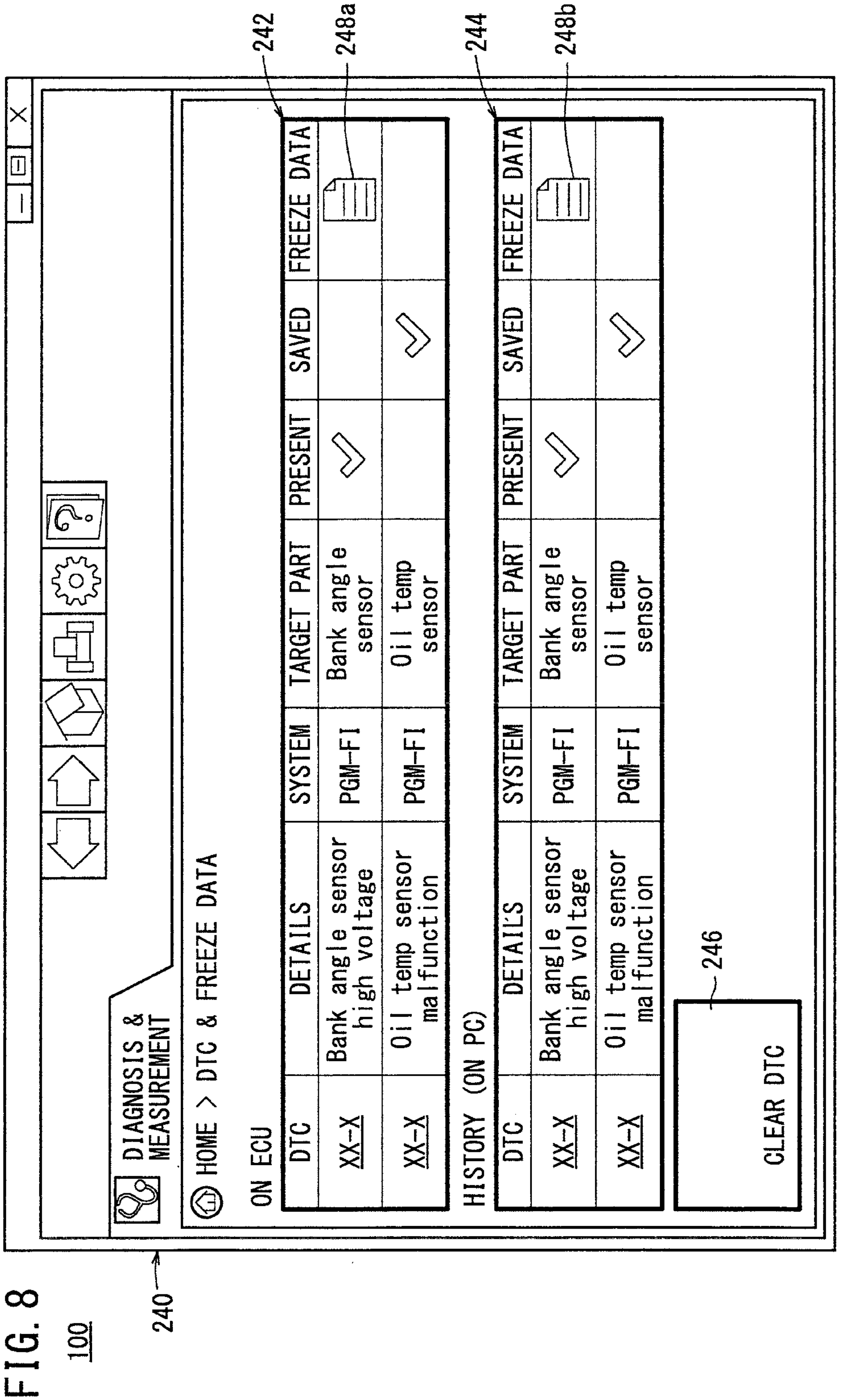
FIG. 8 is a diagram showing an example of a DTC (Diagnostic Trouble Code) and freeze data screen displayed which is used while a DTC and freeze data function is being performed.

FIG. 8 shows by way of example the DTC and freeze data screen 240. As shown in FIG. 8, the DTC and freeze data screen 240 includes an area 242 for displaying information about DTCs acquired from the ECU 20 that is currently communicating with the PC 42, an area 244 for displaying information about DTCs stored in the vehicle DB 130 of the PC 42 with respect to the vehicle 12 to be diagnosed, and a clear button 246. The areas 242, 244 include respective buttons **248*a*, 248*b* for displaying freeze data (hereinafter referred to as "freeze data display buttons 248*a*, 248*b*"). When the user selects the button 248*a* or 248*b* through the operating unit 94, freeze data corresponding to the selected button 248*a* or 248*b* are displayed. The clear button 246** is a button for clearing the displayed information about DTCs.

Back to FIG. 4, if the deterioration diagnosis button 218 is selected (S10: YES), then the PC 42 performs the deterioration diagnosis function 118 in steps S12 through S20.

Figure 9:
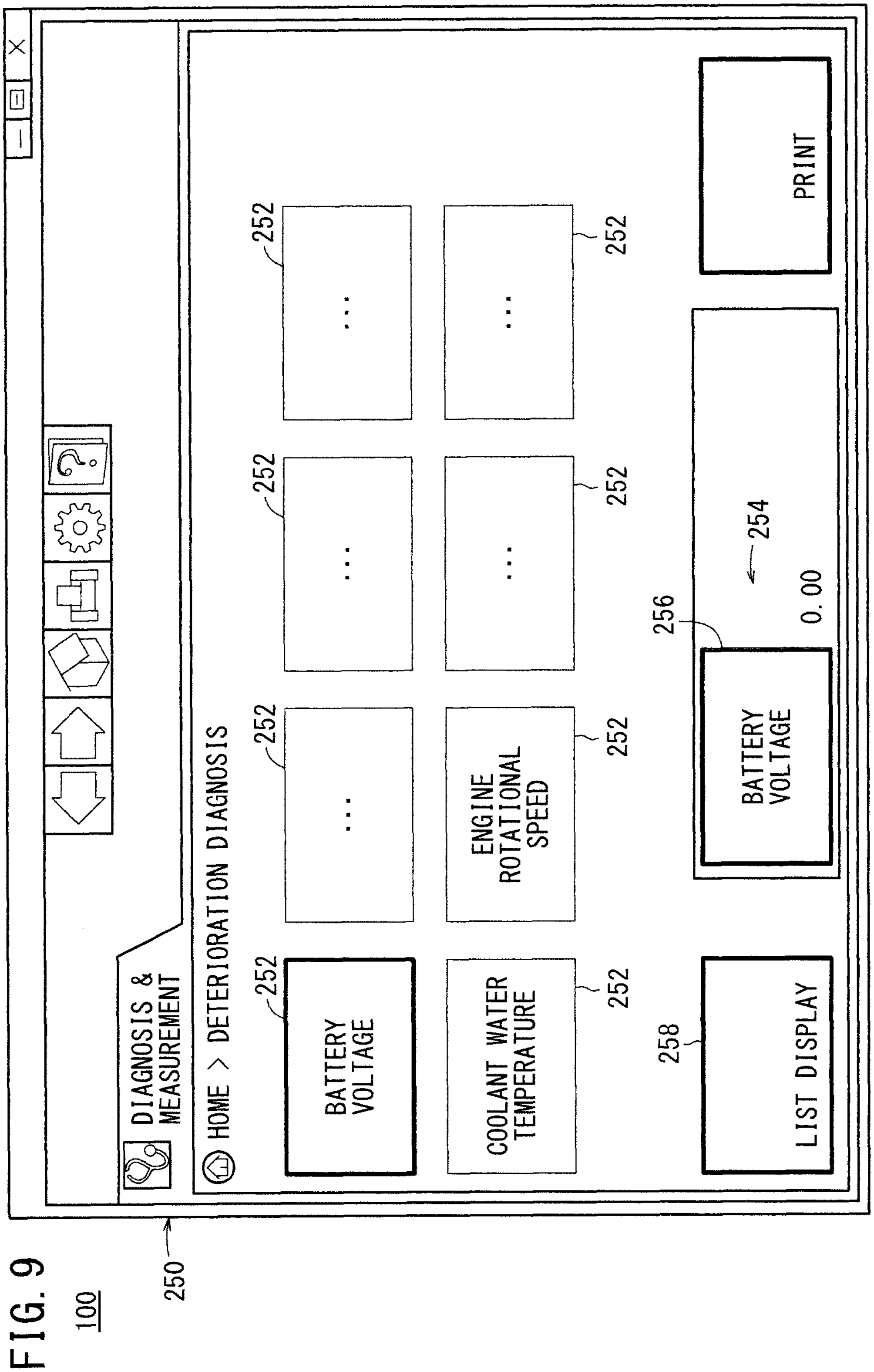
FIG. 9 is a diagram showing an example of a visual display screen displayed which is used while a deterioration diagnosis function is being performed.

Specifically, in step S12, the PC 42 (deterioration diagnosis function 118) displays an initial screen for identifying an item to be diagnosed (an output sensor value of the vehicle 12). As shown in FIG. 9, the initial screen comprises a screen with diagnostic target items to be diagnosed (names) being surrounded by respective frames on the screen (hereinafter referred to as "visual display screen 250"). As described later, while the deterioration diagnosis function 118 is being performed, the displayed screen can be switched, for example, between the visual display screen 250 and a list display screen 260 or the like (see FIG. 10).

FIG. 9 shows by way of example the visual display screen 250 that is displayed. As shown in FIG. 9, the visual display screen 250 includes a plurality of images 252 of diagnostic target items surrounded by respective frames (hereinafter referred to as "framed images 252"). When the user single-clicks either one of the framed images 252 to simply select it through the operating unit 94, the selected framed image 252 is displayed with a thick frame. In FIG. 9, the framed image 252 of the diagnostic target item "BATTERY VOLTAGE" is displayed with a thick frame. Another framed image 256 which corresponds to the simply selected framed image 252 is also displayed together with a numerical value of the diagnostic target item in a display area 254 beneath the visual display screen 250. In FIG. 9, the framed image 256 of the diagnostic target item "BATTERY VOLTAGE" is displayed in the display area 254. When the user double-clicks either one of the framed images 252 to select it through the operating unit 94, a screen, not shown, representing details of the selected framed image 252 is displayed.

The visual display screen 250 includes a display switching button 258 for switching the visual display screen 250 to the list display screen 260.

Figure 10:
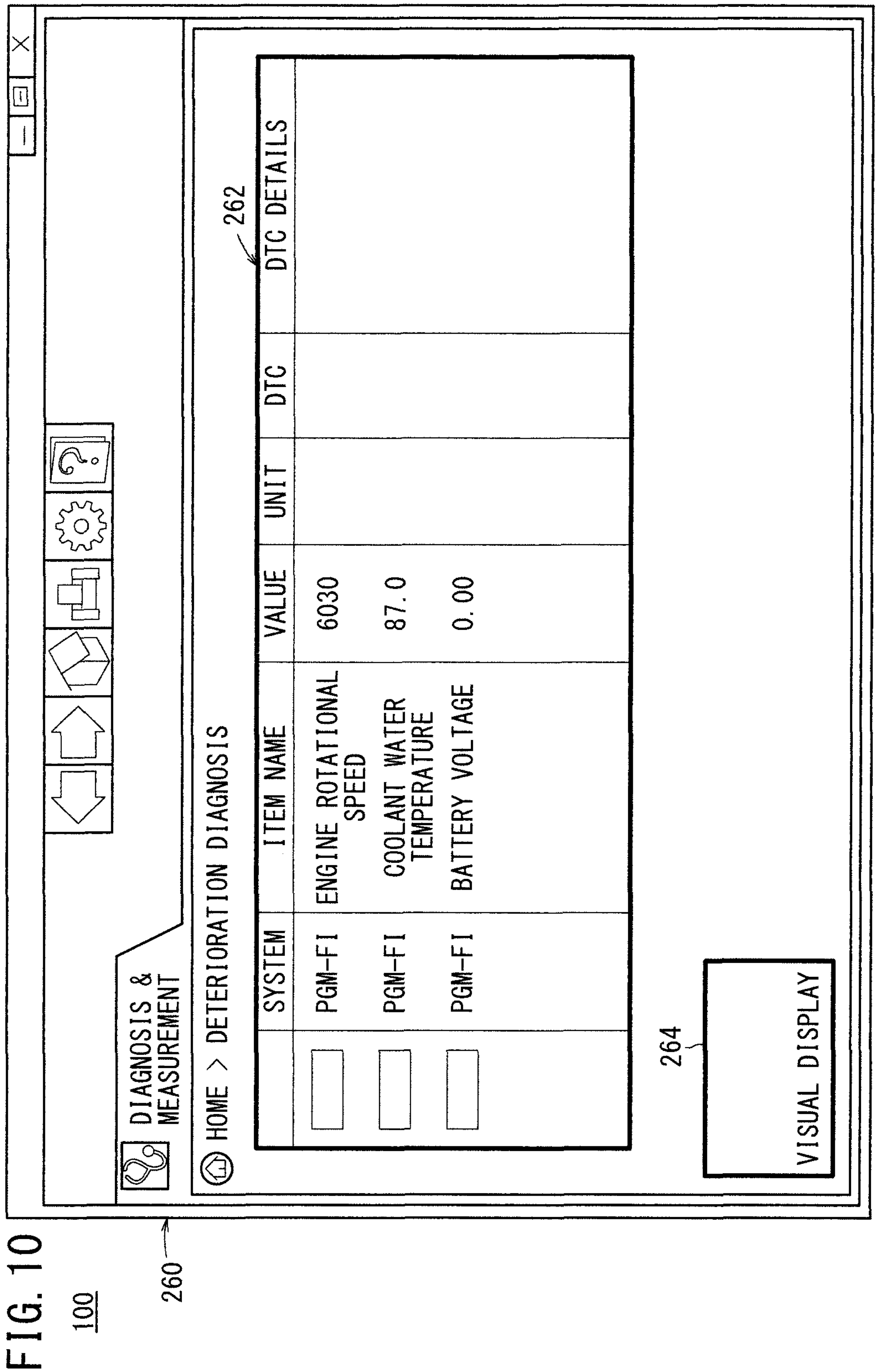
FIG. 10 is a diagram showing an example of a list display screen displayed which is used while the deterioration diagnosis function is being performed.

FIG. 10 shows by way of example the list display screen 260. The list display screen 260 has a list display field 262 (hereinafter referred to as "display field 262") for displaying a list of details of system names, item names, detected sensor values, units, DTC codes, and DTC details of the respective diagnostic target items. When the user single-clicks a line corresponding to a diagnostic target item in the display field 262 to simply select the diagnostic target item through the operating unit 94, the color of the line is changed, i.e., reversed, in display. When the user double-clicks either line to select the corresponding diagnostic target item through the operating unit 94, a screen, not shown, representing details of the diagnostic target item corresponding to the line is displayed.

The list display screen 260 includes a display switching button 264 for switching the list display screen 260 to the visual display screen 250.

Returning to FIG. 4, in step S13, the PC 42 (deterioration diagnosis function 118) judges whether a diagnostic target item has been selected or not. Specifically, the PC 42 judges that a diagnostic target item has been selected if either one of the framed images 252 on the visual display screen 250 has been single-clicked or double-clicked, for example. Alternatively, the PC 42 judges that a diagnostic target item has been selected if either one of the lines in the list display field 262 on the list display screen 260 has been single-clicked or double-clicked.

As described above, diagnostic target items that can be diagnosed in the present embodiment may include an engine rotational speed Ne, a water temperature sensor voltage, a throttle sensor voltage, an intake gas temperature sensor voltage, an intake pressure sensor voltage, an atmospheric pressure sensor voltage, an amount of injected fuel, an ignition timing, an idling air control valve opening degree, a battery voltage, and an oil temperature sensor voltage.

If no diagnostic target item has been selected (S13: NO), then the PC 42 (deterioration diagnosis function 118) judges whether the displayed screen is to be switched or not in step S14. Specifically, if the visual display screen 250 is being displayed, then the PC 42 judges whether the display switching button 258 has been selected or not, and if the list display screen 260 is being displayed, then the PC 42 judges whether the display switching button 264 has been selected or not.

If the displayed screen is to be switched (S14: YES), then the PC 42 (deterioration diagnosis function 118) switches the displayed screen in step S15. Specifically, if the visual display screen 250 is being displayed, then the visual display screen 250 is switched to the list display screen 260. If the list display screen 260 is being displayed, then the list display screen 260 is switched to the visual display screen 250. If the displayed screen is not to be switched (S14: NO) or after step S15, control goes back to step S13.

If a diagnostic target item has been selected in step S13 (S13: YES), then the PC 42 (deterioration diagnosis function 118) acquires data (hereinafter referred to as "target data") for diagnosing the selected diagnostic target item from the ECU 20 in step S16. Specifically, the PC (deterioration diagnosis function 118) sends an output command for the target data to the ECU 20 through the tester 40. In response to the output command, the ECU 20 acquires the target data from the various sensors 24, and sends the acquired target data to the PC 42 through the tester 40.

In step S17, the PC 42 (deterioration diagnosis function 118) compares the acquired target data with a deterioration judgment threshold value. The deterioration judgment threshold value, which is established for each target data, is a threshold value for judging a deteriorated state of the target item. The deterioration judgment threshold value is established for each diagnostic target item as either one of upper and lower limit values.

In step S18, the PC 42 (deterioration diagnosis function 118) displays the result of the comparison between the target data and the deterioration judgment threshold value on the display unit 100.

In step S19, the PC 42 (deterioration diagnosis function 118) judges whether another deterioration diagnosis is to be initiated or not. Specifically, a screen, not shown, for displaying the result of the comparison includes a button for initiating another deterioration diagnosis, and the PC 42 judges whether such a button has been selected or not. If the PC 42 judges that another deterioration diagnosis is to be initiated (S19: YES), then control goes back to step S12. If the PC 42 judges that another deterioration diagnosis is not to be initiated (S19: NO), then control goes to step S20.

In step S20, the PC 42 (deterioration diagnosis function 118) judges whether control is to return to the function selecting screen 200 (FIG. 2) or not. Specifically, the screen, not shown, for displaying the result of the comparison includes a button for returning to the function selecting screen 200, and the PC 42 judges whether such a button has been selected or not. If the PC 42 judges that control is not to return to the function selecting screen 200 (S20: NO), then control goes back to step S18. If the PC 42 judges that control is to return to the function selecting screen 200 (S20: YES), then control goes back to step S4 shown in FIG. 3.

[4. Advantages of the Present Embodiment]

According to the present embodiment, as described above, since a deterioration diagnosis (health diagnosis) using detected sensor values is inhibited until the vehicle 12 has been warmed up, the deterioration diagnosis can be performed accurately.

Figure 7:
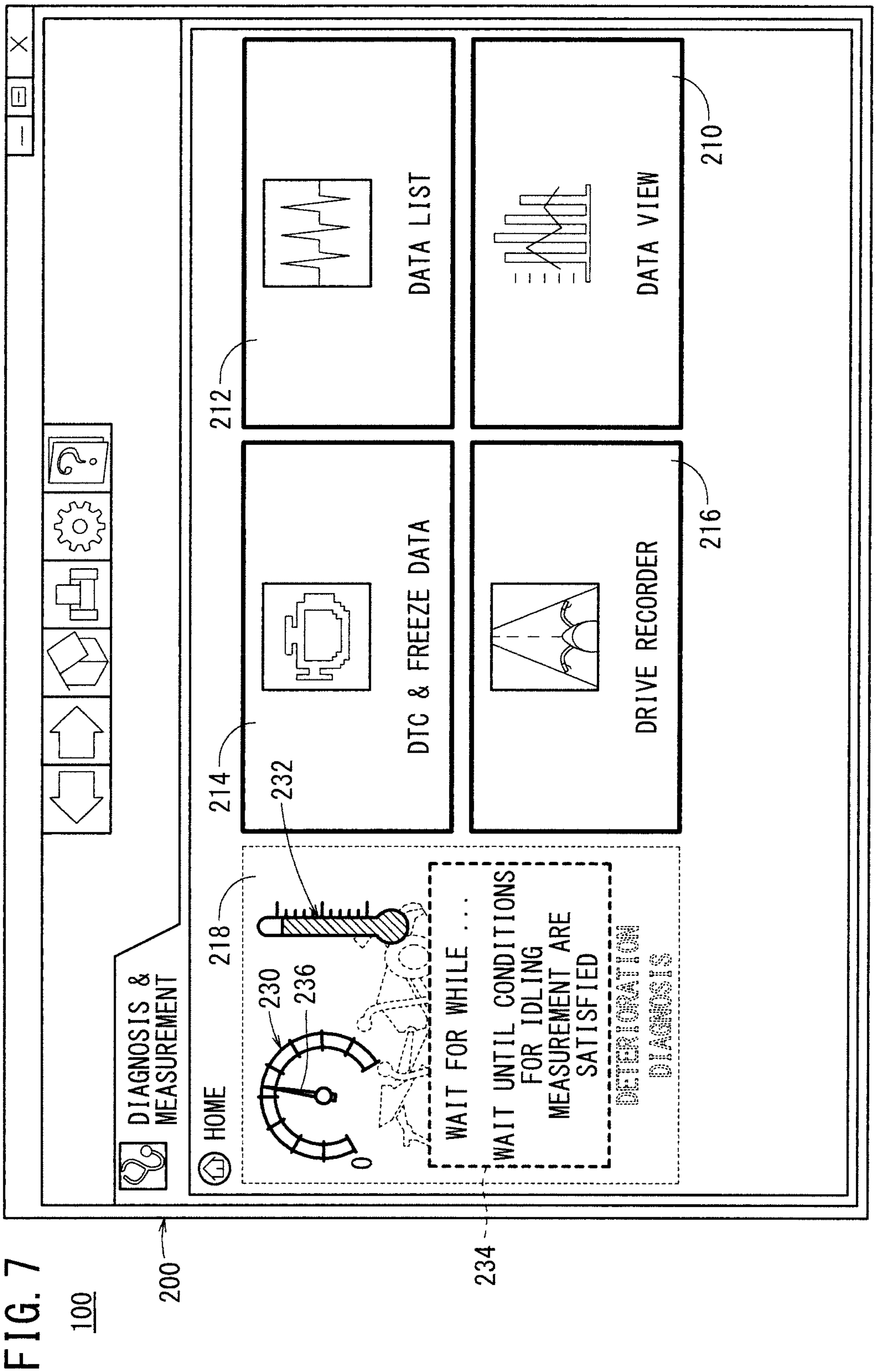
FIG. 7 is a diagram showing an example of the diagnosis function selecting screen displayed with only a deterioration diagnosis function execution button being not active.

While a deterioration diagnosis is being inhibited, the varying states of the engine rotational speed Ne and the coolant water temperature Tw that are used to judge a condition for inhibiting the deterioration diagnosis are displayed (FIG. 7). Therefore, the user can confirm the reason why the deterioration diagnosis is inhibited, as the varying states in the engine rotational speed Ne and the coolant water temperature Tw, and can visually confirm the changing situation and how it changes until the inhibition of the deterioration diagnosis is canceled. In addition, in a case where it is taking more time than usual until the inhibition of the deterioration diagnosis is canceled, the user can recognize which one of the engine rotational speed Ne and the coolant water temperature Tw does not satisfy a condition for canceling the inhibition of the deterioration diagnosis. Therefore, the user is enabled to know that some trouble has been occurring in relation to the engine rotational speed Ne or the coolant water temperature Tw that does not satisfy the condition for canceling the inhibition of the deterioration diagnosis.

According to the present embodiment, it is checked whether the detected sensor values fall within normal ranges or not only when the vehicle 12 is idling (S5 in FIG. 3: YES). Therefore, a deterioration diagnosis can be performed under a condition where the engine 26 is operating stably, and thus the deterioration diagnosis can be performed with high accuracy.

According to the present embodiment, the deterioration diagnosis button 218 for instructing the PC 42 (deterioration diagnosis function 118) to start a deterioration diagnosis is displayed on the function selecting screen 200 while the vehicle 12 is being warmed up and after the vehicle 12 has been warmed up. While the vehicle is being warmed up, the deterioration diagnosis button 218 is displayed as inactive (S7 in FIG. 3), and after the vehicle 12 has been warmed up, the deterioration diagnosis button 218 is displayed as active (S6). The varying states of the engine rotational speed Ne and the coolant water temperature Tw are displayed together with the deterioration diagnosis button 218 that is displayed as inactive (S8).

Thus, the varying states of the engine rotational speed Ne and the coolant water temperature Tw are displayed together with the deterioration diagnosis button 218 that is displayed as inactive until the displayed deterioration diagnosis button 218 goes from inactive to active. Consequently, information about whether the deterioration diagnosis is inhibited or not is given to the user in a plain fashion. In addition, since the user is enabled to know the progress status of warming-up of the vehicle 12 based on the varying states of the engine rotational speed Ne and the coolant water temperature Tw, the user can avoid wrong operations during the waiting time.

According to the present embodiment, while the vehicle 12 is being warmed up, the varying states of the engine rotational speed Ne and the coolant water temperature Tw are displayed as animation images on the function selecting screen 200 (FIG. 7). Thus, the user can easily confirm the varying states of the engine rotational speed Ne and the coolant water temperature Tw, and can effectively use the waiting time until the inhibition of the deterioration diagnosis is canceled.

According to the present embodiment, when the PC 42 is turned on, it acquires the engine rotational speed Ne and the coolant water temperature Tw regardless of whether the engine 26 has started or not. For example, if the engine 26 is turned off and the engine rotational speed Ne is zero, then the animation image 230 representing the engine rotational speed Ne=0 is displayed (S8 in FIG. 3). Owing thereto, the user is enabled to know that the engine 26 is not started.

According to the present embodiment, when the deterioration diagnosis button 218 is displayed as inactive, the other selecting buttons (i.e., the data view button 210, the data list button 212, the DTC button 214, and the drive recorder button 216) are displayed as active on the function selecting screen 200 (FIG. 7).

Therefore, it is possible to start another function even before the preparations for the deterioration diagnosis are completed. The waiting time until the warming-up of the vehicle 12 is completed can thus be used to perform another function.

B. Modifications:

The present invention is not limited to the above embodiment, but may employ various arrangements based on the disclosure of the present description. For example, the present invention may employ the following arrangements:

[1. Objects Incorporating the Invention]

In the above embodiment, the PC 42 is used in combination with the vehicle 12 as a motorcycle. However, the PC 42 may be used in combination with other apparatus that need a warming-up operation (e.g., mobile objects such as ships, aircrafts, or the like).

[2. Configuration of External Diagnostic Apparatus 14]

In the above embodiment, the external diagnostic apparatus 14 comprises the tester 40 and the PC 42. However, it is not limited in this respect. For example, the PC 42 and the tester 40 may integrally be combined with each other if the tester 40 comprises a high-functionality portable terminal device such as a tablet computer, a smartphone, or the like.

In the above embodiment, the PC 42 communicates with the ECU 20 via the tester 40. However, it is not limited to such a configuration. The PC 42 and the ECU 20 may directly communicate with each other through a wireless or wired communication link. Alternatively, a laptop personal computer used as the PC 42 may be arranged to perform the functions of the tester 40.

In the above embodiment, the diagnostic software used by the tester 40 is stored in advance in the storage unit 72 of the tester 40. However, it is not limited to such a configuration. The diagnostic software may be downloaded from the PC 42 or an external source (e.g., an external server accessible through a public network), or may be executed by an ASP (Application Service Provider) without the need for downloading. The diagnostic software used by the PC 42 is stored in advance in the storage unit 98 of the PC 42. However, it is not limited to such a configuration. The diagnostic software may be downloaded from an external source (e.g., an external server), or may be executed by an ASP.

[3. Function Selection and Function Selecting Screen 200]

In the above embodiment, the diagnosis function selecting buttons (i.e., the data view button 210, the data list button 212, the DTC button 214, the drive recorder button 216, and the deterioration diagnosis button 218) that correspond to the respective functions (i.e., the data viewing function 110, the data list function 112, the DTC and freeze data function 114, the drive recorder function 116, and the deterioration diagnosis function 118) are displayed. However, insofar as the deterioration diagnosis button 218 corresponding to the deterioration diagnosis function 118 is displayed, the display configuration is not limited to the above-mentioned one. For example, only the deterioration diagnosis button 218 may be displayed, but none of the data view button 210, the data list button 212, the DTC button 214, and the drive recorder button 216 may be displayed. Alternatively, either one of the data view button 210, the data list button 212, the DTC button 214, and the drive recorder button 216 may not be displayed. Further alternatively, another selecting button may be displayed in addition to the data view button 210, the data list button 212, the DTC button 214, and the drive recorder button 216 or instead of either one of the data view button 210, the data list button 212, the DTC button 214, and the drive recorder button 216.

[4. Deterioration Diagnosis Function 118 and Deterioration Diagnosis Button 218]

In the above embodiment, the engine rotational speed Ne and the coolant water temperature Tw are used as detected sensor values used to judge whether the deterioration diagnosis function 118 can be performed or not (i.e., the status of warming-up) (S5 in FIG. 3). However, the detected sensor values are not limited to the above values insofar as they can be used to judge whether the deterioration diagnosis function 118 can be performed or not. For example, only one of the engine rotational speed Ne and the coolant water temperature Tw may be used. Alternatively, a gearshift position may be used in addition to, or instead of either one of, the engine rotational speed Ne and the coolant water temperature Tw. For example, the deterioration diagnosis function 118 may be judged as performable only when the gearshift position is "P" (parking) or "N" (neutral). Alternatively, the operating state of a foot brake or a parking brake may be used in addition to them or instead of either one of them. For example, the deterioration diagnosis function 118 may be judged as performable only when the foot brake or the parking brake is operated.

In the above embodiment, the vehicle 12 is confirmed as idling (S5) before a selecting button is selected (S9). However, the timing at which the vehicle 12 is confirmed as idling is not limited to the above timing. For example, the vehicle 12 may be confirmed as idling after the deterioration diagnosis button 218 has been selected (S10 in FIG. 4: YES) and until the target data are acquired (S16), and the deterioration diagnosis may be stopped if the vehicle 12 is not idling.

In the above embodiment, while the vehicle 12 is being warmed up, the deterioration diagnosis button 218 is displayed as inactive, and after the vehicle 12 has been warmed up, the deterioration diagnosis button 218 is displayed as active. However, a configuration without such a distinction between inactive display and active display may be provided.

The invention claimed is:

1. A vehicle diagnostic method for diagnosing a vehicle by an external diagnostic apparatus acquiring detected sensor values of the vehicle from the vehicle via data communication between an electronic control unit mounted on the vehicle and the external diagnostic apparatus, wherein the detected sensor values include an engine rotational speed; and the external diagnostic apparatus carries out:

an idling confirming step of measuring whether or not the engine rotational speed is within a normal range for the vehicle that is idling;

a health state measuring step of, when the vehicle is idling, measuring whether the detected sensor values acquired via communication with the electronic control unit are within normal ranges or not;

a measurement inhibiting step of inhibiting the measurement of the health state measuring step after an engine has started and during a period until the detected sensor values including at least the engine rotational speed reach threshold value regions indicating completion of warming-up of the vehicle, in which the vehicle can be judged as being idling; and a varying state display step of displaying varying states of the detected sensor values on an operating screen during a period until the detected sensor values at which the measurement is inhibited reach the threshold value regions.

2. The vehicle diagnostic method according to claim 1, comprising:

displaying, on the operating screen, a first start button for giving an instruction to start the measurement of the health state measuring step;

displaying the first start button as inactive so as to be non-selectable during the measurement inhibiting step;

displaying the first start button as active so as to be selectable after the measurement inhibiting step has been ended; and displaying the varying states of the detected sensor values together with the first start button that is displayed as inactive.

3. The vehicle diagnostic method according to claim 1, wherein the detected sensor values include a coolant water temperature of the engine in addition to the engine rotational speed; and the varying state display step displays, on the operating screen, the varying states of the engine rotational speed and the coolant water temperature as animation images.

4. The vehicle diagnostic method according to claim 3, wherein when the external diagnostic apparatus is turned on, the external diagnostic apparatus acquires the detected sensor values including the engine rotational speed and the coolant water temperature regardless of whether the engine has started or not.

5. An external diagnostic apparatus for diagnosing a vehicle by acquiring detected sensor values of the vehicle through an electronic control unit mounted on the vehicle via data communication with the electronic control unit from outside of the vehicle, wherein the detected sensor values include an engine rotational speed; and the external diagnostic apparatus comprises:

an idling confirming unit for measuring whether or not the engine rotational speed is within a normal range for the vehicle that is idling;

a health state measuring unit for, when the vehicle is idling, measuring whether the detected sensor values acquired via communication with the electronic control unit are within normal ranges or not;

a measurement inhibiting unit for inhibiting the measurement of the health state measuring unit during a period until the detected sensor values including at least the engine rotational speed reach threshold value regions indicating completion of warming-up of the vehicle, in which the vehicle can be judged as being idling; and a varying state display unit for displaying varying states of the detected sensor values on an operating screen after an engine has started and during a period until the detected sensor values at which the measurement is inhibited reach the threshold value regions.

6. The external diagnostic apparatus according to claim 5, wherein a first start button for giving an instruction to start the measurement by the health state measuring unit displayed on the operating screen;

the first start button is displayed as inactive so as to be non-selectable while the measurement by the health state measuring unit is being inhibited;

the first start button is displayed as active so as to be selectable when the inhibition of the measurement by the health state measuring unit is cancelled; and the varying states of the detected sensor values are displayed together with the first start button that is displayed as inactive.

7. The external diagnostic apparatus according to claim 5, wherein the detected sensor values include a coolant water temperature of the engine in addition to the engine rotational speed; and the varying state display unit displays, on the operating screen, the varying states of the engine rotational speed and the coolant water temperature as animation images.

8. The external diagnostic apparatus according to claim 7, wherein when the external diagnostic apparatus is turned on, the external diagnostic apparatus acquires the detected sensor values including the engine rotational speed and the coolant water temperature regardless of whether the engine has started or not.

* * * * *